P. CLIFFORD.
Rivets.

No. 202,994.  Patented April 30, 1878.

Witnesses;
John W Whitehouse
John H. Storer

Inventor;
Patrick Clifford

UNITED STATES PATENT OFFICE.

PATRICK CLIFFORD, OF CAMBRIDGEPORT, MASSACHUSETTS.

IMPROVEMENT IN RIVETS.

Specification forming part of Letters Patent No. 202,994, dated April 30, 1878; application filed November 22, 1877.

*To all whom it may concern:*

Be it known that I, PATRICK CLIFFORD, of Cambridgeport, in the county of Middlesex and State of Massachusetts, have invented a new and useful Improvement in Rivets, of which the following, taken in connection with the accompanying drawings, is a specification:

Although my invention can be applied to any metal, it relates in particular to copper tubular rivets, for the purpose of securing together two or more pieces of leather, or other like material, such as that used in belting, hose, &c.; and it consists in first making from a disk of sheet metal a tube, closed at one end, and of same diameter as the diameter of the head of rivet required. The tube from the open end upward, toward the closed end, is then forced into dies, and compressed until it is small enough to form the shank or body of the rivet, leaving the closed end its original size, and forming the head of rivet.

Figure 1:
Figure 2:
Figure 3:

Figure 1 of the drawings is a central longitudinal section of a tube closed at one end, the same diameter as the head of rivet. Fig. 2 is a similar section of the same, after a portion of it has been compressed in dies of the required size and configuration to partially form the shank or body of rivet, and is used as leading to a more perfect compression in a third set of dies. Fig. 3 is a similar section after it has been further compressed in dies of the required size and configuration to form perfectly the shank or body and the head of the rivet.

I am aware that a rivet has been patented March 17, 1873, from a tube closed at one end; but this tube was made the same diameter as the shank of the required rivet, and of such length that the closed end could be upset, and a secondary or supplementary piece of tube placed over it to be upset, to furnish additional material to form the head of a rivet. In referring to Fig. 5 of above-named patent, it will be seen that in upsetting the end of a tube only a very small head can possibly be upset, hence an additional piece has to be added. This upsetting requires such violent force as to weaken, and often crack, the metal at the outer extremities of the diameter of the head of rivet; but all these objections are overcome by leaving the head of rivet the original thickness of the metal and the original diameter of the tube, as it is done in my invention; and I thus produce a rivet out of one-piece of metal, instead of two pieces, used in patent referred to.

What I claim as my invention, and desire to secure by Letters Patent of the United States, is—

The herein-described method of manufacturing hollow rivets, which consists in first forming, by drawing, a cup-shaped blank, and subsequently reducing the body of the blank by a reversed drawing operation, leaving the closed end of its original diameter to form the head, for the purpose set forth.

PATRICK CLIFFORD.

Witnesses:
 JOHN W. WHITEHOUSE,
 JOHN W. STORER.